No. 625,391. Patented May 23, 1899.
H. S. GARR.
RAPID CLOSING AND SEALING DEVICE FOR JARS, BOTTLES, OR OTHER VESSELS.
(Application filed Nov. 15, 1897.)
(No Model.)
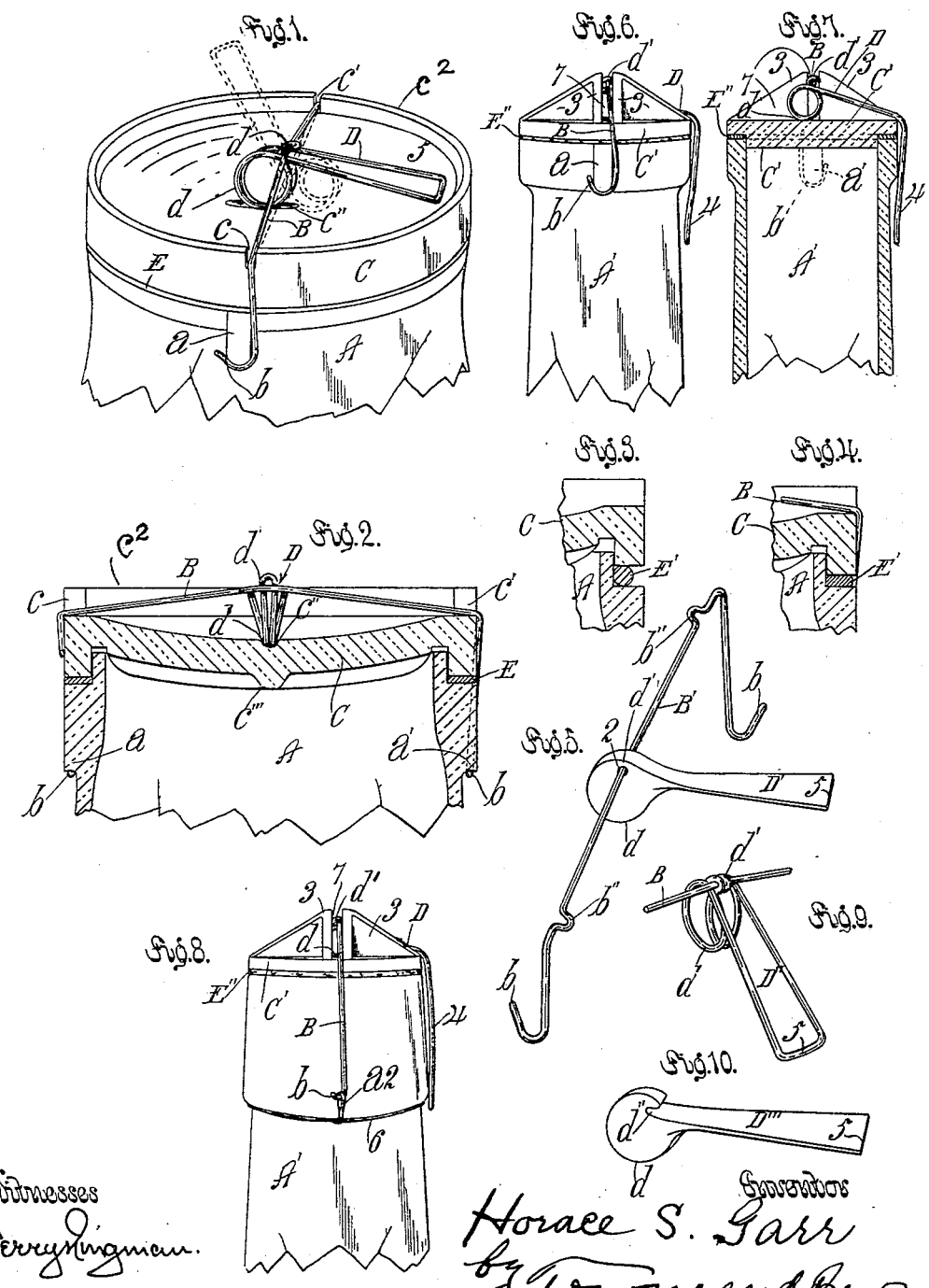
Witnesses
Perry Kingman.
E. A. Waterman.
Inventor
Horace S. Garr
by Townsend Bro.
his atty

UNITED STATES PATENT OFFICE.

HORACE S. GARR, OF LOS ANGELES, CALIFORNIA, ASSIGNOR OF ONE-HALF TO CALVIN F. HUNTER, OF SAME PLACE.

RAPID CLOSING AND SEALING DEVICE FOR JARS, BOTTLES, OR OTHER VESSELS.

SPECIFICATION forming part of Letters Patent No. 625,391, dated May 23, 1899.

Application filed November 15, 1897. Serial No. 658,623. (No model.)

*To all whom it may concern:*

Be it known that I, HORACE S. GARR, a citizen of the United States, residing at Los Angeles, in the county of Los Angeles and State of California, have invented new and useful Improvements in Rapid Closing and Sealing Devices for Jars, Bottles, or other Vessels, of which the following is a specification.

An object of this invention is to provide a vessel closing and sealing device of extreme simplicity, cheapness, and effectiveness and by means of which the operation of closing and sealing the vessel can be performed with great rapidity and which is perfectly secure, but applies the force for sealing at the center only of the cover, so that it is equally exerted upon every part of the contacting face of the closure.

Another object of my invention is to provide means whereby the filled fruit-jars, with caps in place, can be stored one upon another, thus to give greater convenience and economy in storing.

My invention embraces a closure for jars, bottles, and other vessels comprising the combination, with the vessel having oppositely-arranged catches for retaining a bail, of a cover for the mouth of the vessel, a bail fastened to the said catches and extending over the cover, and a lever with fulcrum on one side thereof at one end and a bail seat or catch at the other side of the lever between said fulcrum and the other end of the lever, and having a bearing for the bail considerably wider than the fulcrum, so that perfect stability is given to the lever, but the pressure upon the cover is at a central point only, and therefore equally applied to all points of contact between the cover and the mouth of the jar. The bail seat or catch may be a projecting lug or hook or a hole in the lever through which the bail may be inserted.

The accompanying drawings illustrate my invention.

Figure 1 is a perspective view of my invention as applied to seal a fruit-jar, a fragment of which is shown. Dotted lines indicate positions of parts before the seal is tightened. Fig. 2 is a vertical cross-section from front to back of Fig. 1 alongside the bail. Fig. 3 is a fragmental sectional detail to show the use of a round rubber gasket. This view shows the gasket before it is compressed. Fig. 4 is a detail showing the round-rubber-gasket seal completed. Fig. 5 is a detached view of a bail with cast-metal lever. Fig. 6 is a side elevation of a form of my invention applied on a bottle. Fig. 7 is a vertical section of Fig. 6 alongside the bail. Fig. 8 is a view showing my invention applied to a bottle and held by a wire. Fig. 9 is a view of a wire lever with bail fastened thereon. A fragment only of the bail is shown. Fig. 10 is a view of a cast-metal lever with lug or hook to catch and seat the bail.

A A' indicate a vessel. In Figs. 1, 2, 3, and 4, A indicates a jar, and in Figs. 6, 7, and 8 A' indicates a bottle. The vessel is provided with two oppositely-arranged catches, which may be of any suitable form, such as the lugs $a$ $a'$ or wire loops $a^2$, for retaining the bail B, which is provided with any suitable means—such, for example, as the hooks $b$—to be held by the catches $a$ $a'$ or $a^2$.

The bail B B' extends over the cover C C' of the vessel, and said cover C is preferably provided with an annular upwardly-projecting collar $c^2$, which has oppositely-arranged notches $c$ $c'$ at opposite edges of the cover, and the bail when caught upon the catches extends through the notches and over the cover.

D is a lever with a fulcrum $d$ on one side at one end of the lever and a bail seat or catch $d'$ on the other side of the lever between such fulcrum and the other end of the lever. The top of the cover inside the collar $c^2$ is preferably concave, so that when the bail and lever are in their sealing position they will be chambered in the cover sufficiently to allow another jar to be placed on top of the jar thus sealed, the cover affording a perfect seat for the bottom of the superposed jar. It is to be understood that the lever when in its sealing position may at the center of the cover project slightly above the level of the top of the collar $c^2$, as indicated in Fig. 2, without interfering with superposed jars of the ordinary construction in which the jar-bottom is concave.

The lever D is preferably formed of a loop of wire which is bent into a double ring at one end to form a resilient fulcrum $d$, and the end of the loop is brought up between the side members of the loop and bent to form the bail-seat $d'$ upon that side of the lever which is opposite to the fulcrum. The wires which form the rings for the fulcrum are brought close together on that side of the fulcrum opposite the seat; but the members of the loop which form the seat are so disposed as to form a broad bail-seat.

$c''$ indicates a groove in the top of the cover to seat the rounded portion or fulcrum $d$ of the lever. The cover is preferably concave upon its upper face, and the groove is at the middle of the concavity, so that the concave forms a purchase for the fulcrum to keep the fulcrum from slipping when the lever is moved to apply the seal.

$c'''$ indicates a strengthening-rib on the under side of the cover beneath the portion upon which the fulcrum bears.

In Fig. 5 the lever $D'$ is made of cast metal provided with a hole 2 to form a bail-seat through which the bail B passes.

$b''$ indicates crimps in the bail B to give resiliency to the bail, so that the pressure of the cast-metal lever upon the cover will not be so rigid and harsh as to break the cover in case the same is made of glass.

It is to be understood that any form of cover may be used, whether the same is in the form of a cap, as shown, or in any of the forms of stoppers which take the place of the cap when the mouth to be closed is small.

In Figs. 6 and 7 the lever is bent down at its outer end and fits down on the outside of the neck of the bottle.

In Fig. 8 the bail is held by loops $a^2$ of a wire 6, which is bent around the bottle-neck.

The gasket may be made of cork or rubber or may be a string or any other suitable fabric soaked in paraffin or any other suitable material to stop the pores and to form the seal. In the drawings I have shown three forms of gasket. In Figs. 1 and 2 I have shown a flat rubber gasket E. In Figs. 3 and 4 is shown a gasket-ring $E'$, which is normally circular in cross-section. In Fig. 3 this form of gasket is shown before it is compressed, and in Fig. 4 such gasket is shown compressed, so that it is flattened out to form the seal. This form of gasket is preferable, for the reason that when the ring is flattened by pressure, as shown in Fig. 4, it closes the joint more perfectly and with a given pressure forms a more perfect air-excluding joint than can be formed with an originally flat gasket, as at E. In Figs. 6, 7, and 8 I have shown a thin gasket $E''$, of cork.

The fulcrum portion of the lever is preferably of a circular form, and the bail-seat is arranged at one side of the center of the circle and at or near the junction of the fulcrum with the long arm of the lever, so that the fulcrum operates as a cam when the lever is turned, as it were, from left to right in Fig. 1 to bring the lever into the sealed position shown in solid lines in Fig. 1, and when brought into the sealed position shown in Fig. 1 the pressure of the bail holds the lever down onto the top of the cover or stopper C. The free end of the long arm of the lever is broad and flat, as at 5, so that when it rests upon the cover it tends to hold the lever from canting.

The fulcrum portion of the lever is narrow, and the bail-seat is broad, so that under the pressure of the bail this also tends to hold the lever from canting.

The covers or stoppers $C'$, which I have shown for bottles, are provided with upwardly-projecting ribs 3 for protecting and holding in place the bail and lever. 4 indicates a downwardly-bent arm of the lever to serve as a handle for raising the lever. In Fig. 9 the bent-wire lever $D''$ is fastened to the bail by bending the hook $d'$ down over the wire of the bail. In Fig. 10 the lever $D'''$ is provided with a hook to form the bail-seat $d''$ instead of being provided with a hole, as shown at 2 in Fig. 5.

The purpose of making the top of the cap or cover C concave, as shown in Figs. 1 and 2, is to allow the lever to be easily applied with the hook $d'$ beneath the bail and to hold the lever from slipping and allow it to be then easily turned to bring it into the locking position shown in Fig. 1.

In practical use to seal the vessel the gasket is first properly placed, and the cap, cover, or stopper will then be put in place thereon. Then the bail is brought into position shown in dotted lines in Fig. 1 and caught by the catches on the vessel. Then in case of the detached lever D said lever is brought into position shown in dotted lines in Fig. 1, with the hook under the bail and the fulcrum in the groove or notch. Then the lever is turned into the position shown in solid lines in Fig. 1, thus to lift up the bail and press down the cover or stopper onto the gasket to firmly and effectually close and seal the mouth of the vessel, and the sealing is thus concluded. The broad bail-seat prevents any canting of the lever, and the narrow fulcrum applies the force at the center only of the cover, so that the sealing is made perfect and secure. The broad end 5 of the lever resting on the cover adds to the security against any canting of the lever. The catches at the sides of the cover securely hold the bail from slipping; but the bail has considerable resiliency between them, and the groove assists in holding the fulcrum in true position while the bail is being brought to such a strain as to be rigid, thereby to hold the lever firmly in place. The resiliency of the bail will cause the strain to be applied gradually, thus diminishing the liability of any breakage. To open the vessel, the lever is turned in the reverse direction, thus releasing the seal.

The fulcrum $d$ of the spring-wire lever is a circular coil, the ends being free, so as to form a spring, thus to avoid any danger of breaking the glass stopper or cap.

The side walls of the notches c c' hold the bail from being displaced, and the ribs 3 of the stoppers C' are substantially the same in form and function, but are extended to provide a cruciform notch 7 to protect the lever and its fulcrum and the bail.

The kinked bail may be used with the wire lever, but ordinarily may be dispensed with.

Now, having described my invention, what I claim as new, and desire to secure by Letters Patent, is—

1. A closing and sealing device for jars, bottles and other vessels comprising in combination with a vessel having oppositely-arranged catches for retaining a bail; a cover for the mouth of the vessel and concave on top, and provided with side notches and a central groove; a bail fastened to the said catches and extending over the cover and through the notches; and a lever with narrow fulcrum on one side thereof at one end and a bail-catch with broad bail-seat on the other side thereof between said fulcrum and the other end of the lever.

2. The combination of the vessel having oppositely-arranged catches thereon, the cover for the mouth of the vessel with notches arranged in opposite edges of the cover; a bail caught upon the catches and extending through the notches and over the cover; and a lever with fulcrum on one side at one end of the lever and an open-hook bail-catch on the other side of the lever between such fulcrum and the other end of the lever.

3. A jar having bail-catches and a cover with an annular upwardly-projecting collar around its rim and notches in said collar; a bail seated in said notches and extending over the cover and caught upon the catches; and a lever for tightening the bail, substantially chambered in the cover below the top of the collar substantially as and for the purpose set forth.

4. The lever for vessel-covers consisting of a wire bent into a loop and having at one end a bend with the members of the loop brought close together to form a single narrow fulcrum at one side of the loop, and said looped wire being bent into the form of an open-hook catch between said fulcrum and the other end of the lever and the members of the loop there disposed to form a broad bail-seat opposite the narrow fulcrum.

HORACE S. GARR.

Witnesses:
JAMES R. TOWNSEND,
LEGARA A. BLUHAUGH.